United States Patent [19]
Vingsbo

[11] Patent Number: 5,262,931
[45] Date of Patent: Nov. 16, 1993

[54] POWER CONVERTER
[75] Inventor: Stefan G. Vingsbo, Houston, Tex.
[73] Assignee: Powering, Inc., Houston, Tex.
[21] Appl. No.: 885,861
[22] Filed: Aug. 10, 1992

Related U.S. Application Data

[63] Continuation of Ser. No. 733,141, Jul. 19, 1991, abandoned.

[51] Int. Cl.$^5$ .............................................. H02M 3/07
[52] U.S. Cl. ........................................ 363/16; 363/131; 323/222
[58] Field of Search ................... 363/16, 74, 95, 97, 363/131, 62, 135; 323/220, 222, 299, 303, 206

[56]  References Cited
U.S. PATENT DOCUMENTS

| | | | |
|---|---|---|---|
| 3,719,859 | 3/1973 | Frantz | 317/31 |
| 4,184,197 | 1/1980 | Cuk et al. | 363/16 |
| 4,346,431 | 8/1982 | Steigerwald | 363/27 |
| 4,424,558 | 1/1984 | N'Guyen Uyen | 363/124 |
| 5,027,263 | 6/1991 | Harada | 363/16 |
| 5,181,170 | 1/1993 | Huang et al. | 363/21 |

FOREIGN PATENT DOCUMENTS

| | | | |
|---|---|---|---|
| 61-54873 | 3/1986 | Japan | 363/16 |
| 63-257456 | 10/1988 | Japan | 363/16 |

Primary Examiner—Steven L. Stephan
Assistant Examiner—Adolf Berhane

[57]    ABSTRACT

A power converter has a resonant circuit composed of a serially connected inductor and capacitor. The resonant circuit is selectively connected to a DC voltage source, thereby establishing a charge cycle. The DC voltage source is normally derived from an AC voltage source by means of a rectifier and a filter capacitor. A second capacitor is selectively connected to the resonant circuit, thereby establishing a discharge cycle. The second capacitor is never connected with the resonant circuit simultaneously with the DC voltage source. The second capacitor serves as an output capacitor which maintains a substantially constant voltage. The second capacitor is connected to an external load. A control circuit synchronizes the charge transfers to the resonant frequency of the resonant circuit. The control circuit further measures the output voltage to determine if the second capacitor should be engaged in a discharge cycle in order to maintain its constant voltage. A regulated local power supply is provided to supply the control circuit with DC power. The DC power is derived from an AC voltage source. The local power supply is implemented in solid state.

4 Claims, 9 Drawing Sheets

POWER CONVERTER

This is a continuation of application Ser. No. 7/733,141 filed Jul. 19, 1991, now abandoned.

BACKGROUND OF THE INVENTION

1. Field of the Invention

This invention generally relates to power converters, and more particularly, to a low loss harmonic resonant switching device that utilizes the natural oscillating frequency in an LC circuit to convert a commercially available line voltage to a dynamically selected DC output level.

2. Description of the Related Art

Power converters have been in use since the introduction of AC electricity. Early devices were simple transformers with primary and secondary windings mounted on iron cores. Power converters have evolved over the years into broad ranges of applications such as high power, high voltage, low voltage, portable, etc.

Power converters intended for low voltage and portable applications have endured the most dramatic evolution during recent years. These power converters are normally associated with electrical and electronic products for mass markets such as appliances, computers, radio, television, etc.

The power supply industry in general, and the manufacturers of low power and portable power converters in particular, have mounted sizeable efforts to increase efficiency, and reduce production costs and physical size of power supplies and converters. These efforts have led to the development of the so called switch-mode power supplies. Several different implementations have been developed over the years. However, the common idea among the implementations is the use of an alternating current with a frequency that is higher than that distributed by utility companies. High frequency utilization has led to a reduction in winding and core sizes of transformers. This, in turn, normally reduces the overall physical size, cost and weight of power supplies and converters.

Most switch-mode power converters are built around a high frequency transformer, although some power converters are built around chokes. The general principle of operation is to convert alternating currents into magnetic fields, which are converted back into alternating currents. A transformer or equivalent device performs this process by coupling a magnetic field in a primary winding to a secondary winding by means of a magnetic core. The magnetic field in the primary winding is proportional to a current flowing through the same. A ratio between the primary and the secondary winding on the transformer also determines the ratio between the primary and secondary winding currents. Likewise, chokes may be magnetically coupled to function similarly. Though relatively compact and efficient, these devices do indeed require transformers or equivalent devices. Transformer manufacturing techniques have matured over the years and are not likely to further exhibit significant economies of scale.

Other more recent improvements in the switch mode category of power supplies and converters include methods to reduce switching losses in power transistors and other devices used for generating the operating frequency and supplying power to the transformers or equivalent devices. These types of improvements, although significant for purposes of increasing efficiencies and reducing power dissipations, do not alter the problems normally associated with using transformers.

A potential alternative to power conversions by magnetic fields is conversions by electric fields. Electric fields may be stored in capacitive networks where the equivalent capacitance is subsequently changed, thereby changing the initial voltage. However, the capacitive network approach is only practical where small supply currents are required. Applications where larger supply currents are required normally impose added stress on system components in the form of high peak currents, resulting from charging and discharging the capacitors in the network. Other implications include loading effects where the supply voltage is decreased as a function of the applied load.

Other alternatives do exist. Special applications for, for example, low power conversions may utilize voltage dividers to establish power sources with the desired voltage and current output ratings. However, voltage dividers are normally associated with resistors or other devices that exhibit large losses when used in power conversion applications. Voltage dividers are indeed used for power conversion purposes, but are highly impractical unless power requirements are extremely low.

The present invention is directed to overcoming one or more of the problems set forth above.

SUMMARY OF THE INVENTION

One object of the present invention is to provide a low loss resonant power converter that uses the natural resonant frequency of an LC circuit to establish an alternating current for transferring charge from a first charge storing device to a second charge storing device.

Another object of the present invention is to provide a power converter that utilizes an electric transfer of charge as its principal mode of operation. Electric charges are transferred from a DC voltage source of relatively high electric potential to a charge storage device. Charges are subsequently transferred to a second charge storage device resulting in a substantially lower electric potential.

Another object of the present invention is to provide a power converter that utilizes an electric transfer of charge as its principal mode of operation in conjunction with a resonant (or oscillating) device resulting in a cyclic behavior of the electric charge transfer. The resonant device further exhibits current limitation means.

Another object of the present invention is to provide a monitoring circuit that supervises the operation of the power converter. The control circuit utilizes a time reference which is separate from and synchronized to the oscillating circuit.

Another object of the present invention is to provide a dynamically adjustable DC output voltage.

Another object of the present invention is to provide a power converter that eliminates the need for transformers and other large magnetic circuits.

Another object of the present invention is to provide a power converter that incorporates one or more switches that exhibit reduced switching losses by means of zero current switching.

Another object of the present invention is to provide synchronization of the switch operation to the natural resonant frequency of the resonant circuit.

Another object of the present invention is to provide a charge transfer circuit in a power converter that synchronizes charge transfers to the second charge storing device to the discharge of the first charge storing device as directed by the resonant device. The charge transfer to the second charge storing device is further restricted by the output voltage from the power converter, where the charge transfer takes place subject to determining that the output voltage level is low.

Another object of the present invention is to provide circuitry for generating a local supply voltage suitable for control electronics contained in the power converter.

Another object of the present invention is to provide a power converter that exhibit a small physical size and a low weight.

In accordance with the invention a power converter is provided that utilizes electric charge transfer as its principal mode of operation. The charge transfer circuit comprises a capacitive network where a first capacitor receives charge from a DC voltage source (DC source). A second, substantially larger, capacitor subsequently receives charge from the first capacitor. The voltage divider formed by the two capacitors determines the amount of charge transferred from the first capacitor to the second capacitor during each discharge cycle of the first capacitor. The amount of charge transferred from the first capacitor to the second capacitor in conjunction with the capacitance of the second capacitor determines an incremental voltage appearing between the terminals of the second capacitor. The incremental voltage is accumulated in the second capacitor during subsequent charge and discharge cycles, and is used as an output DC voltage of the power converter. The magnitude of the incremental voltage determines the output ripple, appearing as a superimposed AC voltage on the output DC voltage.

An inductor is connected in series with the first capacitor to form a resonant circuit that also incorporates current limitation and reduces switching losses in electronic switches, used to control the direction of charge transfer. The switches direct charge from the DC source to the resonant circuit in a charge cycle. The switches also direct charge from the resonant circuit to the second capacitor. The latter charge transfer is referred to as a discharge cycle since it drains charge from the first capacitor which is contained in the resonant circuit. The charge and the discharge cycles are mutually exclusive events, and are guided by a set of control signals. The resonant circuit determines the frequency of operation of the power converter.

The output voltage is regulated by comparing the instantaneous output voltage appearing across the terminals of the second capacitor, to a reference. A control signal indicative of a need to replenish the charge in the second capacitor, and thereby increase the output voltage, is derived from the output voltage comparison and synchronized to a discharge window of the first capacitor. The discharge window is the cyclic time frame when the first capacitor discharges through the inductor into the second capacitor. The synchronized control signal may be omitted during a given discharge cycle to maintain the present voltage, or it may be included during a given discharge cycle to increase or maintain the output voltage, thereby providing a means to dynamically regulate the output voltage. In cases where the discharge control signal is omitted, a discharge path for the resonant circuit is provided by an electronic switch that connects the resonant circuit to the DC source. The electronic switch remains closed during the discharge cycle and the subsequent charge cycle. Furthermore, the output voltage comparison method provides for output voltage adjustments by external means, such as a potentiometer. The output voltage adjustment range is only limited by the magnitude of the voltage from the DC source that is connected to the first capacitor.

A supply voltage source is also provided to derive a low operating voltage suitable for the control electronics. The supply voltage source derives a low voltage from an available AC voltage source, preferably the same AC voltage source that supplies power to the power converter itself. A serial combination of current limiting device and a zener diode provides a voltage of low magnitude. The voltage is maintained by the zener diode as a series of pulses, each pulse being derived from a half cycle of the AC supply voltage. The voltage pulses are further rectified and regulated by series regulation means to obtain a stable DC voltage.

To attain these and other objectives an apparatus is provided for implementing one or more of the features set forth above.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

1. GENERAL OVERVIEW

Figure 1:
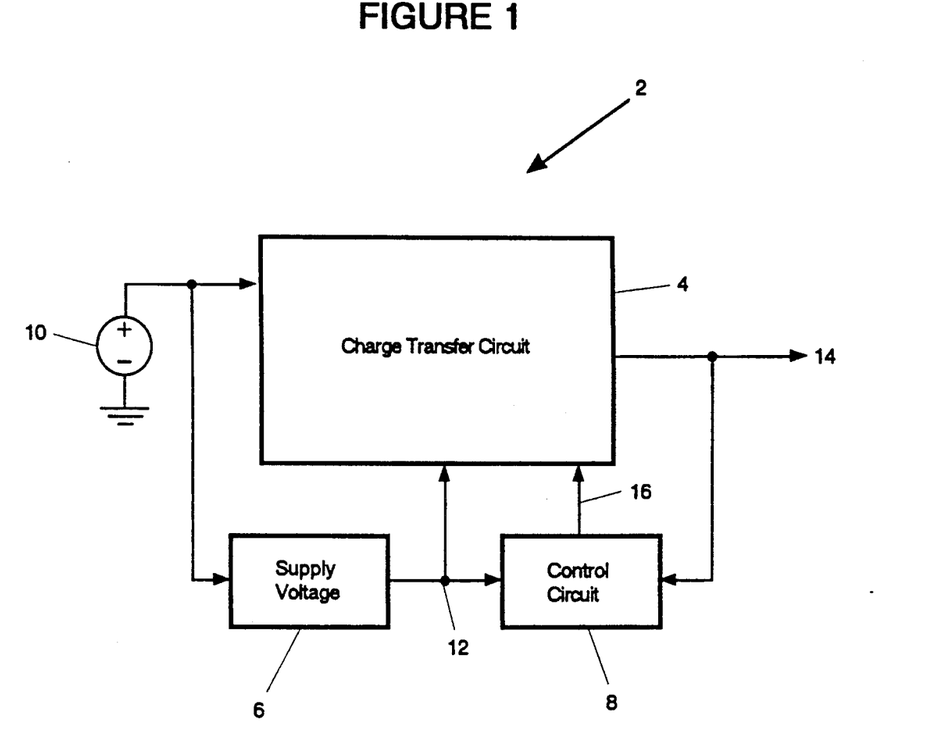
FIG. 1 is a block diagram of the power converter, showing its integral parts.

Turning now to the drawings and referring to FIG. 1, a block diagram of the power converter 2 is shown. The power converter may be represented by three general building blocks: a charge transfer circuit 4, a circuit for generating a supply voltage 6 to drive local control electronics, and a control circuit 8. An AC voltage source 10 supplies power to the charge transfer circuit 4 and to the local supply voltage generator 6. The local supply voltage generator 6 supplies the control electronics in the control circuit 8 and other electronics in the charge transfer circuit 4 with power through power connections 12. The charge transfer circuit 4 delivers an output voltage 14 to an external load (not shown). The control circuit 8 receives the output voltage 14 to regulate the charge transfer circuit 4 by applying control signals 16 to the charge transfer circuit 4.

Figure 2:
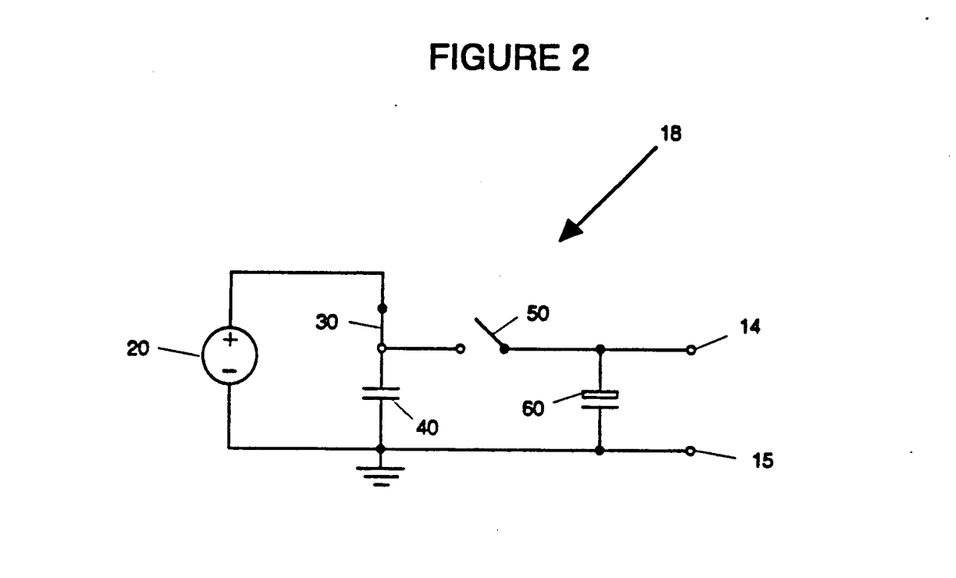
FIG. 2 is a schematic diagram of an ideal charge transfer circuit, operative in a charge cycle.

FIG. 2 is a schematic diagram of an ideal charge transfer circuit 18 during a charge cycle. A first switch 30 supplies charge from a DC power source 20 to a first capacitor 40. The DC power source 20 is normally derived from a rectified AC voltage such as that delivered by power or utility companies. A second switch 50 is open to prevent charge from propagating directly from the DC source 20 to a second capacitor 60. The first switch 30 remains closed until the first capacitor 40 is charged sufficiently to reach an electric potential equal to the electric potential of the DC source 20. The total charge in the first capacitor 40 is proportional to the electric potential of the DC source 20 and the capacitance of the first capacitor 40 itself. It should be recognized that the first and the second switches 30, 50 may be replace by a single switch exhibiting dual poles.

Figure 3:
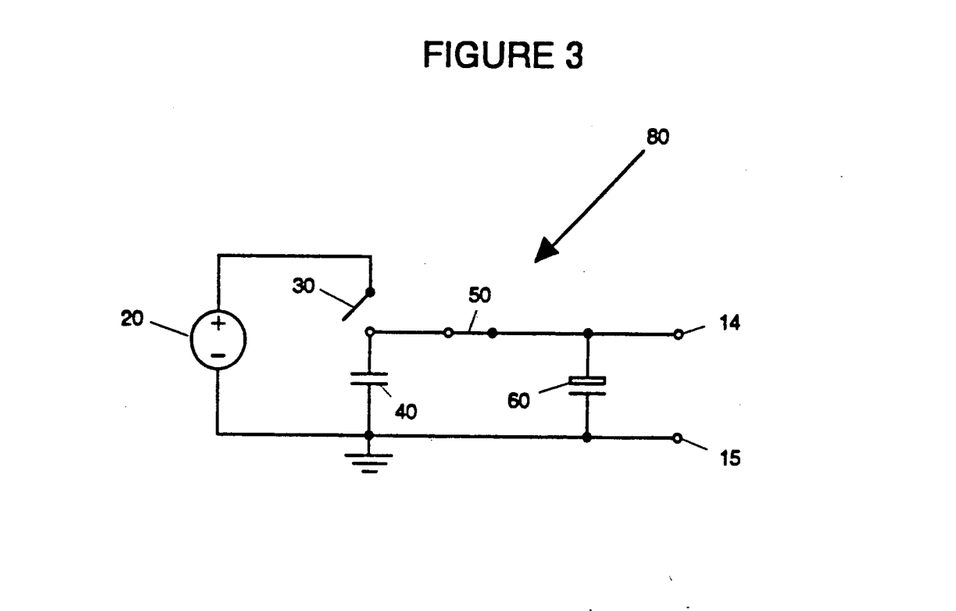
FIG. 3 is a schematic diagram of the ideal charge transfer circuit in FIG. 1, operative in a discharge cycle.

FIG. 3 illustrates a discharge cycle of a charge transfer circuit 80, which is essentially identical the charge transfer circuit 18 of FIG. 2. The first switch 30 is opened subsequently to completing the charge cycle in order to isolate the first capacitor 40 from the DC source 20. The second switch 50 is closed, thereby transferring charge from the first capacitor 40 to the second capacitor 60. The transfer of charge continues until the electric potential of the first capacitor 40 equals the electric potential of the second capacitor 60. The final potential across the terminals of the first and second capacitors 40, 60 is determined by the charge in the first capacitor 40 at the onset of the discharge cycle and an equivalent capacitance in the discharge circuit. The equivalent capacitance comprises the sum of the capacitance of the first and the second capacitors 40, 60.

Each discharge cycle transfers charge from the first capacitor 40 to the second capacitor 60 where it is accumulated and made available to an external load, such as a computer or another electrical device. Node 14 signifies a connection terminal for one or more loads, and terminal 15 signifies a ground terminal. Each charge transfer to the second capacitor results in an incremental voltage, also referred to as ripple, to appear across the terminals of the second capacitor 60. The magnitude of the incremental voltage is proportional to the total amount of charge transferred to the second capacitor 60 and the capacitance of the second capacitor 60. Hence, the capacitance of the second capacitor 60 is chosen to be substantially larger than the capacitance of the first capacitor 40 to assure that the magnitude of the transferred charge is small in comparison to the total charge stored in the second capacitor 60. A number of subsequent charge and discharge cycles are required in order to accumulate sufficient charge in the second capacitor 60 to sustain a desired output voltage at node 14.

Figure 4:
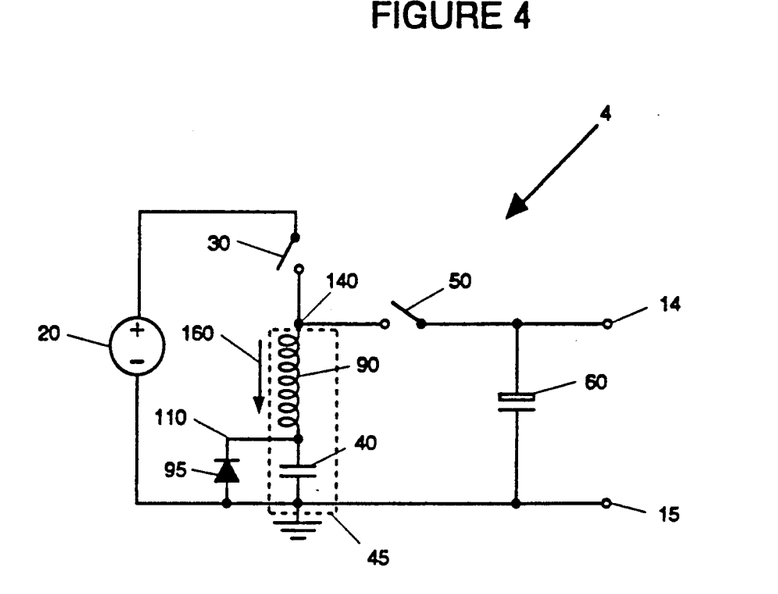
FIG. 4 is a schematic diagram of a practical charge transfer circuit as implemented in the present invention.

FIG. 4 shows a preferred embodiment 4 of the charge transfer circuits 18, 80 illustrated in FIGS. 2 and 3. The ideal charge transfer circuit lacks means to control the magnitude of currents 160 rushing into the first capacitor 40 from the DC source 20. Internal resistance in the first switch 30 limits the maximum current to a certain degree, but results in undesirable stress on the switch 30 itself. Likewise, the second switch 50 endures stress from discharging the first capacitor 40 into the second capacitor 60.

An inductor 90, serially connected between the first and second switches 30, 40 and the first capacitor 40 reduces the magnitude of the current 160 flowing into and out from the first capacitor 40, thereby reducing the stress on the first and second switches 30, 50. Furthermore, the inductor 160 forms a resonant circuit 45 with the first capacitor 40. A natural oscillating frequency of the resonant circuit 45 determines the frequency of operation of the charge transfer circuit 4 itself.

A diode 95 is provided to half-wave rectify the voltage appearing across the first capacitor 40. The diode 95 prevents a depletion of charge, resulting in a negative voltage, from appearing across the first capacitor 40. The reduction of negative voltages across the first capacitor 40 enhances stability of the oscillating circuit 45 by means of limiting the maximum negative voltage across the first capacitor 40.

Figure 5:
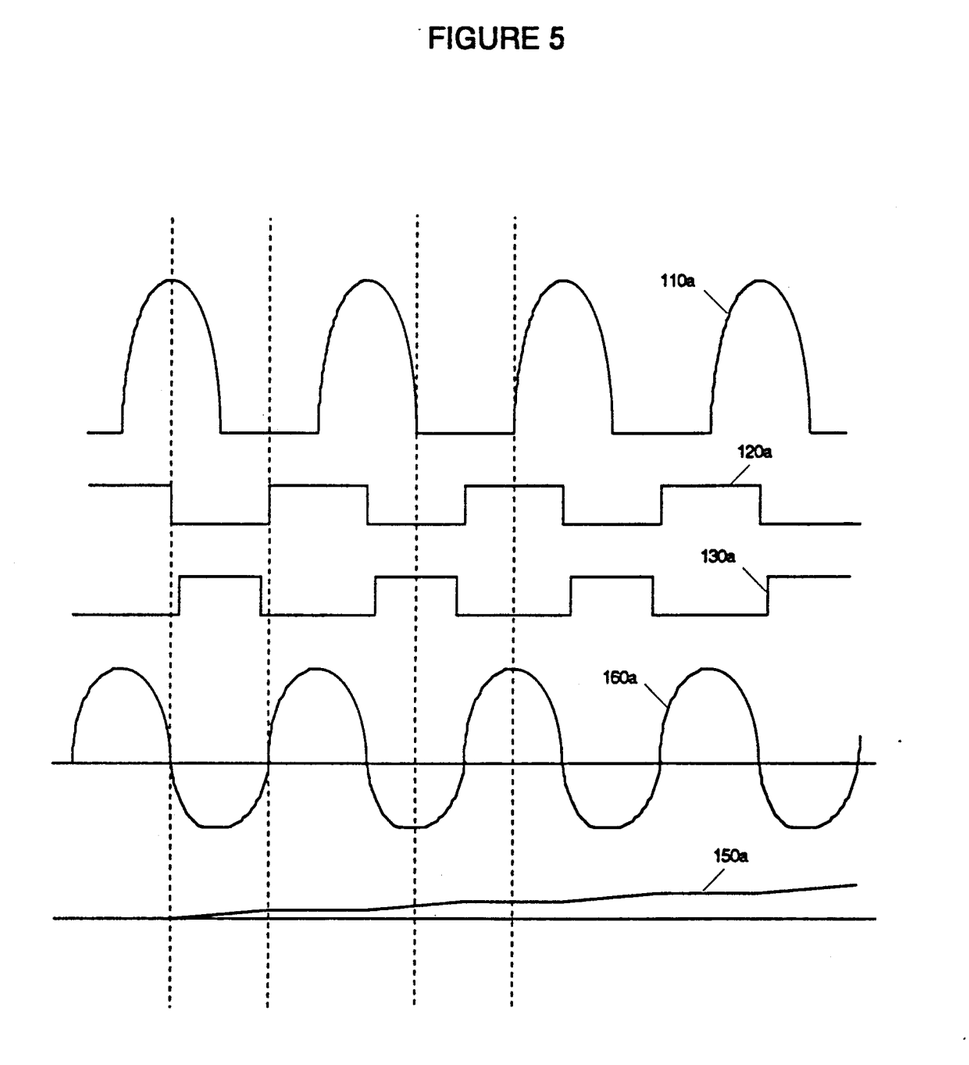
FIG. 5 is a timing diagram of relevant control signals, node voltages and currents in the charge transfer circuit and the control circuit of the power converter during an active mode of operation.

FIG. 5 illustrates control signals, voltages and currents and their respective internal synchronization in the power converter as it operates in an active mode of operation. A resonant voltage appearing on a node 110 (FIG. 4), common to the inductor 90, the first capacitor 40 and the cathode of the diode 95, resembles a half-wave rectified sinusoid 110a. A resonant inductor current 160a crosses its zero Ampere reference point each time the resonant voltage 110a reaches its maximum voltage. The resonant inductor current 160a also crosses its zero Ampere reference point when the resonant voltage 110a reaches its minimum voltage. A first switch control signal 120a is synchronized to the occurrence of the maximum and the minimum resonant voltage 110a to engage the first switch during zero crossings of the inductor current 160a. A second switch control signal 130a is provided to control the second switch 50. The second switch control signal 130a operates out of phase with the first switch control signal 120a, with brief signal delays to establish a so called "brake before make" signal relationship. This switching scheme of the first and second switches 30, 50 assures that the switches 30, 50 do not short circuit the DC source 20 with the second capacitor 40 during the onset of the first or the second switch control signals 120a, 130a.

The voltage across the second capacitor 60 is provided as an output voltage 150a to external loads connected to the present invention. The output voltage 150a appears as a "staircase function" during initial start-up, but settles to a stable DC voltage during subsequent operation.

Figure 6:
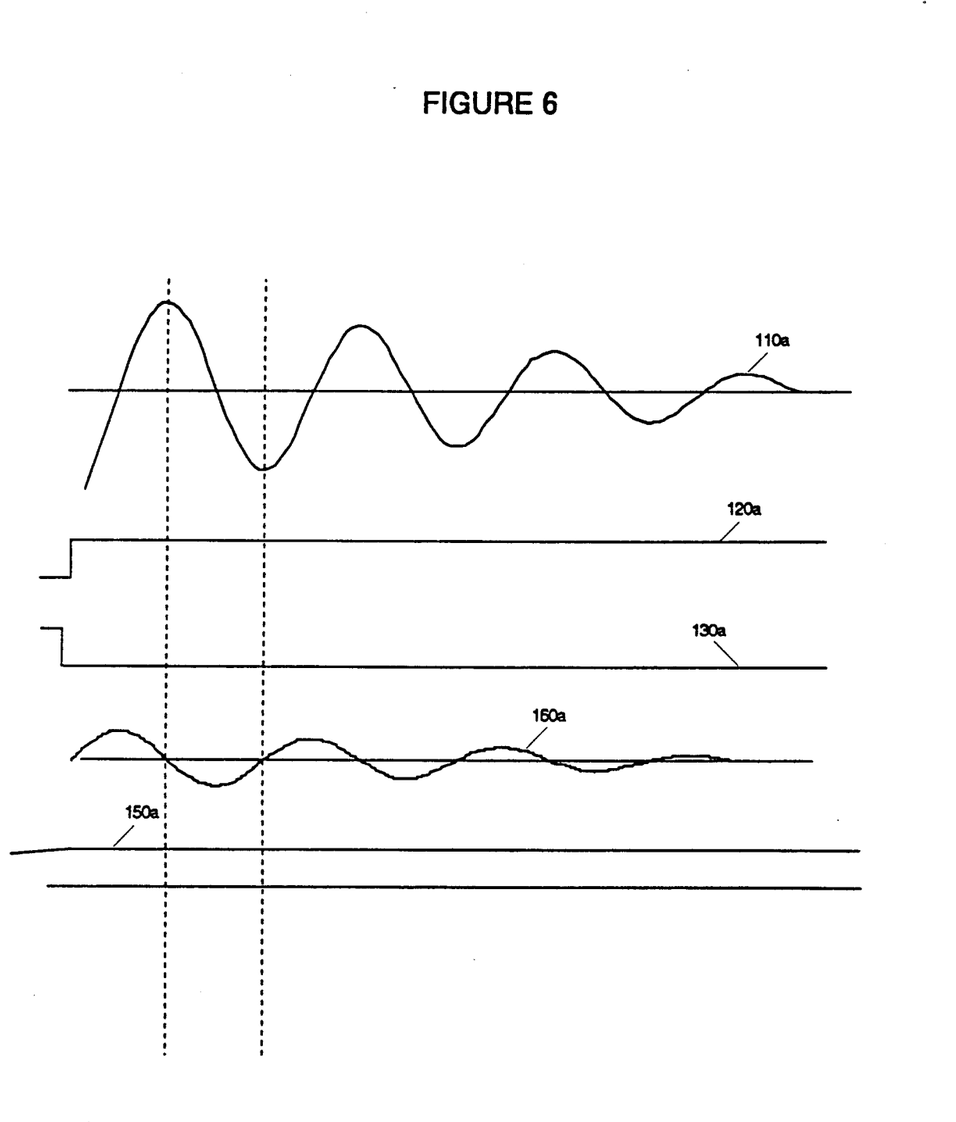
FIG. 6 is a timing diagram of relevant control signals, node voltages and currents in the charge transfer circuit and the control circuit of the power converter during an idle mode of operation.

FIG. 6 illustrates the generation of the first and second switch control signals 120a, 130a during an idle mode of operation when the second capacitor 60 remains sufficiently charged (i.e. when external applied loads are small). The first switch control signal 120a remains asserted, and the second switch control signal 130a remains unasserted, until the second capacitor 60 is sufficiently depleted of charge for returning to the active mode of operation, as illustrated in FIG. 5.

The resonant voltage 110a is gradually dampened during the idle mode of operation, until the oscillating circuit 45 reaches steady state. A steady state implies that transient condition are substantially reduced, which in this case translates to a resonant voltage 110a comprising a DC voltage substantially equal in magnitude to the DC source voltage, and an inductor current 160a essentially reduced to zero Ampere magnitude.

It should be noticed that the present invention does not make use of a transformer or other magnetically coupled device. This results in a device with smaller physical dimension. Benefits are also realized in manufacturing, where mounting procedures associated with a transformer are eliminated. Cost benefits are also realized since the parts count is relatively low, and since most of the electronic parts are of solid state. Additionally, most parts are so called "of the shelf items" which are produced in extremely long manufacturing runs, thereby additionally reducing cost.

Additionally, it should be noticed that the present invention is not limited to using so called "of the shelf items". It is likely that additional benefits may be reaped by consolidating some, or all, of the monitoring and control circuits into a single electronic package. Such a device, normally referred to as a "custom integrated circuit" or simply integrated circuit, is manufactured by several domestic companies. The manufacturers provide several services, ranging from the manufacturing of the device to design, prototyping, testing etc. This type of device is becoming increasingly popular since it normally reduces the cost associated with a device. Additional benefits are reductions in physical size, power consumption, and cost of assembly of the final product.

2. DETAILED DESCRIPTION

Figure 7:
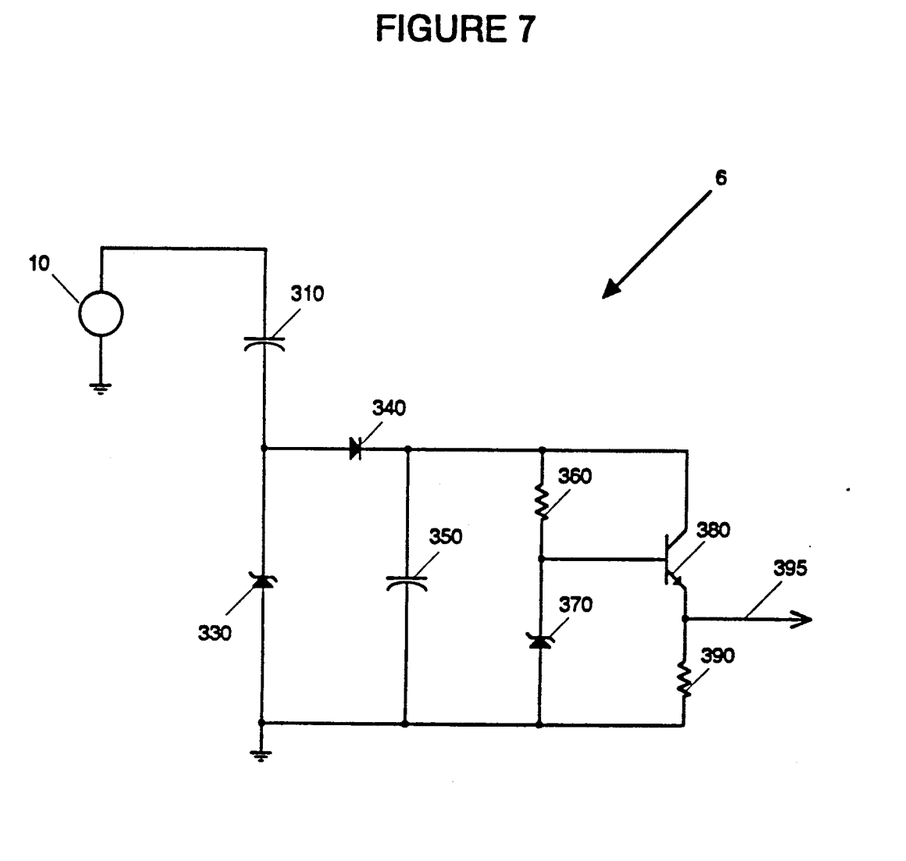
FIG. 7 is a detailed schematic diagram of the supply voltage generation as implemented in the preferred embodiment.

Turning now to a detailed description of the preferred embodiment and referring to FIG. 7, a circuit 6 is provided for generating a local supply voltage for control circuits and other circuits requiring a stable DC voltage. A first capacitor 310 is connected between an AC voltage source 10 and the cathode of a first zener diode 330. The first zener diode is further connected with its anode to ground. The first capacitor 310 limits the magnitude of a current delivered from the AC voltage source 10 to the first zener diode 330. The first zener diode 330 establishes a reference voltage in the form of a pulse which coincides with each positive part of a sinusoidal voltage from the AC source 10. A rectifying diode 340 is connected with its anode to the cathode of the first zener diode 330, and its cathode to a second capacitor 350. The second capacitor 350 is further connected to ground and serves to filter the voltage pulses that are rectified by the rectifier diode 340. A first resistor 360 is connected between the cathode of the rectifier diode 340 and the cathode of a second zener diode 370. The anode of the second zener diode 370 is further connected to ground. The first resistor 360 and the second zener diode 370 jointly provide a stable DC reference voltage. A first transistor 380, connected with its collector to the cathode of the rectifying diode 340, its base connected to the cathode of the second zener diode 370, and its emitter connected to a second resistor 390, provides voltage regulation of the rectified voltage appearing across the second capacitor 350. The stable DC reference voltage, established by the first resistor 360 and second zener diode 370, determines a regulated output voltage 395 available at the emitter of the first transistor 380. The second resistor 390, which is also connected to ground, ensures that a bias current flows through the transistor 380 at all times. The transistor 380 is preferably a bipolar npn transistor when implementing a regulated voltage source, since the emitter terminal provides low impedance to a load. A pnp device is preferred when implementing a current source, since the collector terminal provides a high impedance source. The collector and emitter connections of the transistor 380 should be reversed when implementing a current source with a pnp transistor. A bipolar transistor is chosen mainly for its availability and low cost, but other transistor technologies may be applied as well. J-Fet and MOS FET transistors may also be suitable as regulator transistors.

The local supply voltage circuit 6 apparently functions without the use of a transformer and may therefore be more economical to produce. Furthermore, the elimination of the transformer results in space savings that may be used for other purposes or, alternatively, may result in a smaller power converter.

Figure 8:
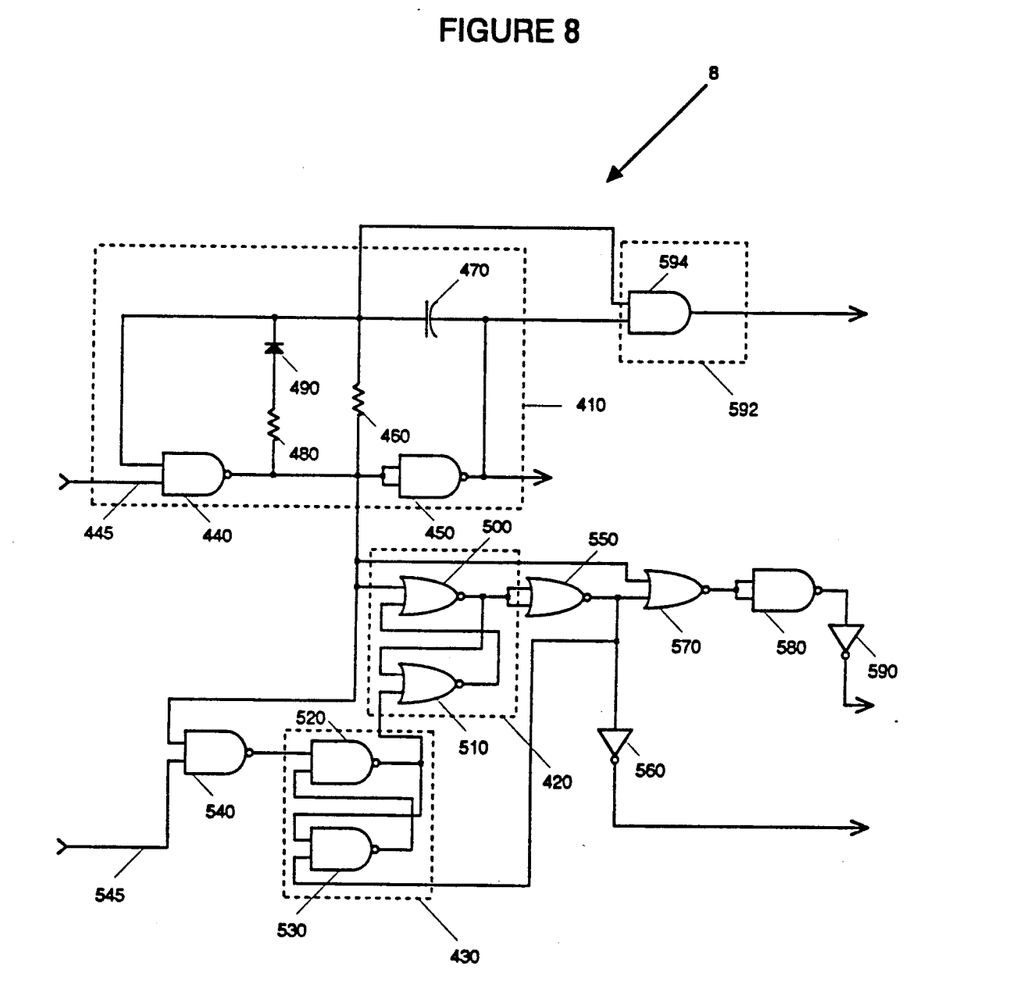
FIG. 8 is a detailed schematic diagram of the control circuit as implemented in the preferred embodiment.

FIG. 8 illustrates a detailed schematic diagram of a control circuit 8 for a preferred embodiment. The schematic diagram mainly comprises four elements: an oscillator 410, a first latch 420 for holding a present state of the control circuit 8, a second latch 430 for holding a future state of the control circuit 8, and a sample and hold control circuit 592. The implementation of the first and the second latches 420, 430 is sometimes referred to as a "master slave" flip-flop or latch.

The oscillator 410 is implemented by using two commercially available digital logic gates 440, 450. The logic gates 440, 450 are of Nand type with Schmitt triggering inputs to reduce noise sensitivity. The oscillator 410 is basically a square wave generator, in which the duty cycle is modified to accommodate rectangular wave forms, where an active low logic state is maintained during more than 50% of any given cycle. Hence, a duty cycle of less than 50% is achieved. An input to the oscillator senses the presence of a synchronizing signal 445 that indicates a proper switching time, derived from the resonant voltage 110a (FIG. 5). The oscillator 410 is kept waiting in its active high logic state until the occurrence of that synchronizing signal 445; thus assuring that the oscillator 410 bases its timing on events in the charge transfer circuit 4 (FIG. 1).

A first resistor 460 is connected between a first input terminal and the output terminal of the first Nand gate 440. The output of the first Nand gate 440 is also connected to both inputs of the second Nand gate 450. A capacitor 470 is connected to the first input terminal of the first Nand gate 440 and the output terminal of the second Nand gate 450. A second input of the first Nand gate 440 is connected to a synchronization signal 445 which is derived from the resonant voltage 110a (FIG. 5). The synchronization signal 445 is responsive to the occurrence of the peak voltage of the resonant voltage 110a (FIG. 5). The first resistor 460 and the capacitor 470 form an RC-circuit which defines the operating frequency for the oscillator 410. A second resistor 480 is serially connected with a diode 490. The serial combination of the second resistor 480 and the diode 490 is connected in parallel with the first resistor 460. The anode of the diode 490 faces the second resistor 480, thereby providing a second charge path to the capacitor 470. The second charge path decreases the duty of the output waveform from the oscillator 410, to below 50%. The duty cycle of the oscillator 410 is maintained in this manner to insure that the capacitor 470 is sufficiently charged for the oscillator 410 to change from a logic high state to logic low state, when a synchronization signal 445 arrives at the second input terminal of the first Nand gate 440. The output signal of the first Nand gate 440 is used as the oscillator 410 output.

The remainder of the control circuit 8 defines a set of time intervals, or time windows, that are used for scheduling activation of control signals. A signal that is activated during a time window will remain activated throughout the duration of that window. A signal that misses its proper time window is omitted. The time windows are based on the oscillator 410, and maintain substantially the same oscillating frequency and duty cycle. A pair of latches 420, 430 implements this timing structure.

The first latch 420 is provided to store an active (present) state of control signals during a given cycle. This scheme prevents feedback from rippling through the control circuit. Such feedback could prematurely change the present state. The first latch 420 stores a present state of control signals during the onset of a charge cycle in the charge transfer circuit 4 (FIG. 1). The present state is derived from a previous future state, which in turn is stored in the second latch 430. The second latch 430 stores the future state of control signals during the charge cycle of the charge transfer circuit 4 (FIG. 1). Furthermore, the second latch 430 prevents feedback from a future logic state to activate control signals in a present logic state.

The first latch 420 comprises a first and a second Nor gate 500, 510. An output of the first Nor gate 500 is connected to a first input terminal of the second Nor gate 510; the output of the second Nor gate 510 is connected to a first input of the first Nor gate 500. A second input terminal of the first Nor gate 500 is connected to the output of the first Nand gate 440 in the oscillator 410, and is therefore responsive to the oscillator 410 output. A second input terminal to the second Nor gate 510 is connected to the output of the second latch 430. The output of the first Nor gate 500 serves as the output of the first latch 420. The second latch 430 comprises a Third and fourth Nand gate 520, 530 in the same constellation as the Nor gates in the first latch 420. A first input of the third Nand gate 520 is connected to the output of the fourth Nand gate 530. A first input of the fourth Nand gate 530 is connected to the output of the third Nand gate 520. The second input of the fourth Nand gate 530 is connected to the inverting output of the first latch 420. A third Nor gate 550 is connected to the output of the first latch 420 and provides the inverting output from the first latch 420. The second input of the third Nand gate 520 is connected to the output of a fifth Nand gate 540. A first input of the fifth Nand gate 540 is connected to the output of the oscillator 410. A second input of the fifth Nand gate 540 is connected to a control signal 445 responsive to the output voltage level (output voltage control signal) of the charge transfer circuit 4 (FIG. 1). The second input of the fifth Nand gate 540 controls the future state of the control circuit, and is stored in the second latch 430 when the oscillator 410 is in its high logic state.

The output from the first latch 420 is inverted by the third Nor gate 550 and coupled to a first switch driver 560. The first switch driver 560 controls a first switch responsive to a charge cycle in the charge transfer circuit 4 (FIG. 1). A fourth Nor gate 570 has its first input connected to the output of the third Nor gate 550, and its second input connected to the output of the oscillator 410. The output of the fourth Nor gate 570 is inverted by a sixth Nand gate 580 which, in turn, is connected to a second switch driver 590. The second switch driver 590 controls a second switch, responsive to discharge cycles in the charge transfer circuit 4 (FIG. 1). The fourth Nor gate 570 provides a slight signal delay for the second switch driver 590, to reduce the time that both switches are simultaneously activated. This switching scheme is also referred to as "brake before make".

The sample and hold control circuit 592 comprises an And gate 594 which synchronizes a sample and hold circuit 644 (FIG. 10) to the charge and discharge cycles as dictated by the oscillator 410. The sample and hold control circuit 592 becomes asserted at the onset of a discharge cycle. The And gate 594 has two input terminals which are connected to opposite sides of the capacitor 470. The output of the And gate 594 also constitutes the output of the sample and hold control circuit 592.

An alternative to the control circuit described above could, for example, be implemented by a sub-cyclic counter. This counter operates at a frequency which is much higher than the resonant frequency of the resonant circuit 45 (FIG. 4). Furthermore, the counter is started at the onset of every charge cycle and is synchronized to the onset of every charge cycle. The counter reaches its final count coincident with the maximum resonant voltage 110a (FIG. 5), upon which the counter starts a discharge cycle in the charge transfer circuit.

There are additional methods to synchronize the charge and discharge cycles of the control circuit to the natural resonance frequency of the resonant circuit in the charge transfer circuit. For example, the current flow through the inductor 160a (FIG. 5) may be detected as a measure to synchronize the control circuit 8 to the maximum resonant voltage 110a (FIG. 5). The maximum resonant voltage coincides with a zero Ampere conduction current through the inductor. References to the maximum resonant voltage may be omitted in this case, since it is the zero Ampere conduction current that is significant to minimize switching losses in the electronic switches.

Figure 9:
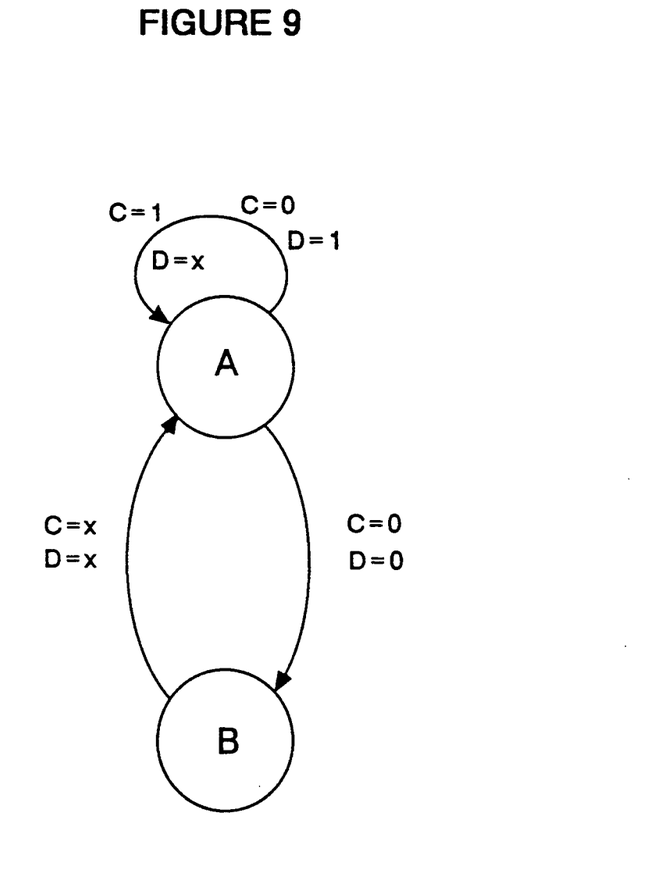
FIG. 9 is a state diagram for the control circuit as implemented in the preferred embodiment.

FIG. 9 is a state diagram of the operation of the control circuit 8 (FIG. 8). Two machine states are defined, where a first machine state A corresponds to a charge cycle of the change transfer circuit 4 (FIG. 1). A second machine state B corresponds to a discharge cycle of the charge transfer circuit 4 (FIG. 1). The control circuit 8 (FIG. 8) remains in the first machine state A when an output voltage control signal C, that corresponds to the output voltage control signal 545 (FIG. 8), is in its high logic state (corresponds to an output voltage being below its intended voltage). A second machine state B is entered when the output voltage control signal C is in its logic high state and when the oscillator output signal D is simultaneously in its logic low state. Any subsequent cycle, as defined by the oscillator 410 (FIG. 8), forces a return to the first machine state A.

Figure 10:
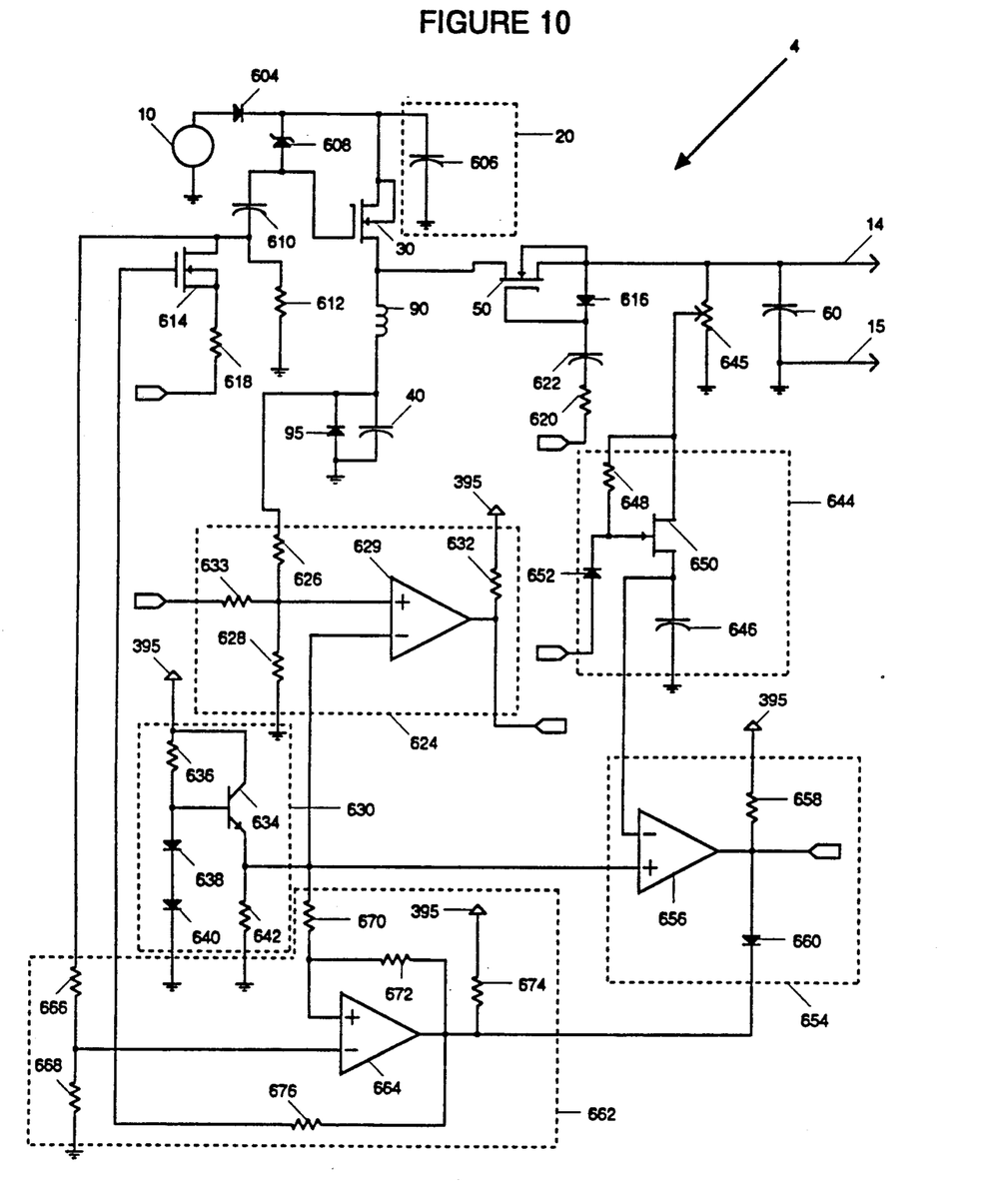
FIG. 10 is a detailed schematic diagram of the charge transfer circuit as implemented in the preferred embodiment.

FIG. 10 is a schematic diagram of a preferred embodiment of the charge transfer circuit 4. The diagram illustrates the use of an AC voltage source 10, but the charge transfer circuit 4 is equally adaptable to be used with a DC voltage source. The AC voltage from the AC voltage source 10 is, in fact, rectified and filtered to provide a DC voltage. A rectifier diode 604 is connected with its anode to the AC source 10 and provides a filter capacitor 606 with a rectified voltage. The filter capacitor is connected between the cathode of the rectifier diode 604 and ground, and provides a DC voltage for the charge transfer circuit 4. The filter capacitor 606 forms a DC source 20, equivalent to what is shown in FIGS. 1, 2, 3, and 5.

A p-channel MOS FET transistor is used as a first switching device 30, which is connected with its source to the filter capacitor 606, its gate connected to the anode of a zener diode 608, and its drain connected to an inductor 90. The substrate of the MOS FET 30 is shown to be connected to the source terminal. This connection is normally performed at the time of manufacturing of the MOS FET device, and is therefore hidden in the device package. The zener diode 608 has its cathode connected to the filter capacitor 606 and is incorporated in the circuitry for protecting the gate of the MOS FET switch 30 from being damaged by gate-source voltages exceeding plus or minus 20 volts. High gate voltages may damage a thin oxide layer that insulates the gate from the substrate inside the MOS FET switch 30. A decoupling capacitor 610 is provided to superimpose the control signals on the DC supply voltage, provided by the filter capacitor 606. A first resistor 612 is provided for charging the decoupling capacitor 610 during initial start-up. A third MOS FET switch 614 is also provided for insulating the first switch driver 560 (FIG. 8) from the DC supply voltage provided by the filter capacitor 606 during initial start-up of the power converter. The decoupling capacitor 610 provides the necessary insulation subsequent to being fully charged. A first capacitor 40 is connected between the inductor 90 and ground. A diode 95 is connected with its cathode to the first capacitor 40 and its anode to ground. The first capacitor 40 and the diode 95 are also depicted in FIG. 4. A second MOS FET switch 50 is connected with its drain to the drain of the first MOS FET switch 30, with its gate to the cathode of a second diode 616, and with its source connected to the anode of the second diode 616. The substrate of the second MOS FET switch 50 is connected to the source inside the device package. A second capacitor 60 is connected between the source of the second MOS FET switch 50 and ground. The second capacitor 60 maintains a voltage available to an external load. A switch control signal for the first MOS FET switch 30 is delivered from the first switch driver 560 (FIG. 8) through a second resistor 618, into the source of the third MOS FET switch 614, through the decoupling capacitor 610, and into the gate of the first MOS FET switch 30. The second resistor 618 limits the gate current and reduces potential instability problems associated with a high gate impedance in the first MOS FET switch 30. Similarly, a second switch control signal is delivered from the second switch driver 590, through a third resistor 620, through a second decoupling capacitor 622, and into the gate of the second MOS FET switch 50. Again, the third resistor 620 limits the gate current for the second MOS FET switch 50, and reduces potential stability problems.

A synchronization circuit 624 provides an output signal that is responsive to the crest of the resonant voltage 110a (FIG. 5). This output signal was referred to as the synchronization signal in discussing the operation of the control circuit 8 (FIG. 8). Furthermore, the synchronization circuit 624 also has an input signal which is derived from the control circuit 8 (FIG. 8). The input signal originates from the output of the second Nand gate 450 (FIG. 8) and is the inverse of the oscillator 410 output (FIG. 8).

The synchronization circuit 624 measures the resonant voltage 110a (FIG. 5) through a voltage divider, consisting of a fourth resistor 626 connected in series with a fifth resistor 628. The resulting divided voltage is compared by a comparator 629 to a reference voltage, available from a reference circuit 630. A synchronization signal is transmitted from the synchronization circuit 624 upon determining that the instantaneous resonant voltage 110a (FIG. 5) is of sufficiently high magnitude. A sixth resistor 632 is connected between the local supply voltage and the output of the synchronization circuit 624 to provide an additional time delay, which further tunes the synchronization signal to the occurrence of the maximum resonant voltage 110a (FIG. 5). A seventh resistor 633 is connected between the voltage divider, comprising the fourth and the fifth resistors 626, 628, and the output of the second Nand gate 450 (FIG. 8).

The reference circuit 630 utilizes a bipolar transistor 634 for so called active voltage regulation, where the bipolar transistor 634 compensates for minor variations in, for example, the local supply voltage. An eighth resistor 636 is connected between the local supply voltage 395 and the anode of a third diode 638. The anode of the third diode 638 is also connected to the base of the bipolar transistor 634. The cathode of the third diode is connected to the anode of a fourth diode 640. The cathode of the fourth diode 640 is connected to ground. The eight resistor 636 limits a current flowing from the local supply 395 to the base of the bipolar transistor 634 and the third and the fourth diodes 638, 640. The third and the fourth diodes 638, 640 form a stable reference point for the bipolar transistor 634. A ninth resistor 642 serves to bias the bipolar transistor at all times, and is connected between the emitter of the bipolar transistor 634 and ground. The Output from the reference circuit 630 is supplied at the emitter of the bipolar transistor 634, which utilizes feed-back to regulate the reference voltage.

A sample and hold circuit 644 measures a fraction of the output voltage available at a potentiometer 645, connected to the second capacitor 60. The fractional output voltage is subsequently stored in a holding capacitor 646 where it is maintained. The sample and hold scheme is utilized to assure that the fractional output voltage is stable when referenced by other circuits. A tenth resistor 648 is connected between the fractional output voltage and the gate of a J-FET switch 650. The tenth resistor 648 is used to bias the J-FET switch 650, which opens and closes a charge path for the holding capacitor 646. A fifth diode 652 is connected with its cathode to the gate of the J-FET switch, and its anode to the sample and hold control circuit 592 (FIG. 8). The fifth diode 652 serves to isolate the fractional output voltage from the sample and hold circuit 592.

An output voltage regulation circuit 654 is used to compare the fractional output voltage to the reference voltage, available at the reference circuit 630. The potentiometer 645 is used to set a fractional voltage which, in turn, is compared to the reference voltage from the reference circuit 630, to maintain regulation. The potentiometer 645 is used to set a variable output voltage of the power converter. Regulation is provided by maintaining the fractional voltage at the same magnitude as the reference voltage. A signal, responsive to a decrease in the fractional voltage is output by a second comparator 656 to signal the second latch 430 (FIG. 8) that the second capacitor 60 need to be replenished with electric charge. The adjustable output voltage range of the power converter is limited only by the magnitude of the DC voltage supplied by the DC source 20.

An eleventh resistor 658 is provided to ensure that the second comparator 656 is referenced to the local supply voltage. The eleventh resistor 658 is connected between the local supply voltage and the output of the second comparator 656. A sixth diode 660 is provided to ensure that the second comparator 656 is isolated from a start-up circuit 662. The sixth diode 660 is connected with its anode to the output of the second comparator 656 and with its cathode to the output of the start-up circuit 662.

The start-up circuit 662 isolates the control circuits from the DC source 20 during start-up. This is accomplished by maintaining the third MOS FET switch 614 in its off state. A charge path is provided for the first decoupling capacitor 610 through the first resistor 612. The output control circuit 654 is also maintained in its off state by means of the sixth diode 660. The start-up operation is governed by a third comparator 664 which measures a voltage proportional to the voltage at the drain terminal of the third MOS FET switch 614. The proportional voltage is derived by a voltage divider comprising a twelfth resistor 666 connected between the drain terminal of the third MOS FET switch 614 and a thirteenth resistor 668. The thirteenth resistor 668 is also connected to ground. The proportional voltage is compared to the reference voltage provided by the reference circuit 630. The start-up circuit 662 terminates its operation upon determining that the proportional voltage is sufficiently smaller than the reference voltage available at the reference circuit 630. The start-up circuit 662 is additionally provided with hysteresis to reduce sensitivity to noise. A fourteenth resistor 670 and a fifteenth resistor 672 provide this function. The fourteenth resistor 670 is connected between the output of the reference circuit 630 and the positive input terminal of the third comparator 664. The fourteenth resistor 672 is connected between the positive input terminal and the output terminal of the third comparator 664. A sixteenth resistor 674 connects the output of the third comparator 664 to the local supply voltage to establish an output voltage reference. A seventeenth resistor 676 connects the output of the third comparator 664 to the gate terminal of the third MOS FET switch 614. This resistor also serves to reduce the input sensitivity of the third MOS FET switch 614.

What is claimed is:

1. A power converter, comprising:
   a first charge storage means,
   a power source, said power source providing a substantially stable DC voltage;
   a first switch means, said first switch means comprising means for selectively providing a first charge path from said power source to said first charge storage means, said first switch means also comprising means responsive to a first switch control signal;
   a first inductive means, said first inductive means forming a first resonant circuit with said first charge storage means, said first resonant circuit being responsive to transferring charge through said first charge path, said charge transfer being carried out by a current comprising a substantially sinusoidal wave form, said first resonant circuit also being responsive to reducing an inrush current into said first charge storage means;
   said first resonant circuit also being responsive to reducing conducted and radiated electromagnetic interference by maintaining a substantially sinusoidal charge transfer current that comprises a substantially singular frequency content;
   a second charge storage means and a second switch means, said second switch means comprising means for selectively providing a first discharge path from said first charge storage means to said second charge storage means, said second switch means also comprising means responsive to a second switch control signal, said first and second switch means providing a first charge path and a first discharge path that are operated on a mutually exclusive basis said first inductive means forming a second resonant circuit with said first charge storage means and said second charge storage means, said second resonant circuit being responsive to transferring charge by sinusoidal currents through said first discharge path;
   said second resonant circuit being responsive to reducing outrush currents, conducted and radiated electromagnetic interference in a similar fashion as said first resonant circuit;
   said second charge storage means being further adapted to providing power to a connected load;
   said second charge storage means having a capacity for storing charge, said capacity being inversely related to a ripple voltage appearing at said second charge storage means, said ripple voltage occurring from a drain of charge from said second charge storage means into a connected load, said ripple voltage also occurring from a transfer of charge from said first charge storage means into said second charge storage means;
   said first charge storage means having a capacity substantially smaller than said capacity of said second charge storage means, a ratio of said capacity of said first charge storage means and said capacity of said second charge storage means being indicative of said ripple voltage occurring during said transfer of charge from said first charge storage device to said second charge storage device.

2. A power converter as recited in claim 1 comprising means for reducing negative potentials from appearing across said first charge storage means during a first discharge cycle, said inductive means responding to said first discharge cycle by storing magnetic energy which is subsequently transferred to said second charge storage means, said magnetic energy transfer contributing to the charge transfer during said first discharge cycle, said negative potential reduction means being responsive to substantially reducing an increasing magnitude of a negative potential from appearing across said first charge storage means, thereby increasing the stability of circuit operation.

3. A power converter as recited in claim 1 wherein said first switch control signal is asserted during a charge cycle of said first charge storing means;
   said charge cycle being characterized by sinusoidally transporting charge from said power source to said first charge storage means, said charge transport being governed by said first switch control signal, said first switch means, and a resonant frequency of said resonant circuit;

said first switch control signal responding to said sinusoidal charge transfer by ending said charge cycle by deasserting said first switch means when the current of the sinusoidal charge transfer is substantially reduced to zero;

said ending of said charge cycle when said current of said charge transfer is substantially reduced serves to reduce the overlap of current and voltage in said first switching means during a switching transition, said reduced current and voltage overlap serves to reduce switching losses in said first switching device;

said second switch control signal being responsive to said deasserted first switch control signal and a third asserted control signal;

said third asserted control signal being responsive to the magnitude of a voltage corresponding to said power provided to said connected load, said third control signal being asserted in response to a decrease in the magnitude of said voltage of said power provided to said connected load;

said second switch control signal responding to said deasserted first switch control signal and said asserted third control signal by signaling said second switch means, said second switch means subsequently responding to said signaling by providing charge transport from said first charge storing means through said inductive means to said second charge storage means;

said charge transport from said first charge storage means to said second charge storage means being terminated when the current of said charge transfer is substantially reduced, said second switching means also benefitting from reduced switching losses similarly to those of said first switching means.

4. A method for converting power of a given electric potential into a substantially lower electric potential by utilizing transfers of electric charge;

said transfers of electric charge comprising a first charge transfer from a power source to a first charge storage means, said first charge transfer being controlled by a first electronic switch means, said first charge transfer being limited by a first resonant circuit comprising an inductive means and said first charge storage means, said first resonant circuit reducing said first charge transfer to substantially sinusoidal behavior, said sinusoidal behavior being responsive to substantially reduce inrush current into said first charge storage means;

said first electronic switch means being responsive to a first electronic switch control signal, said first electronic switch control signal being responsive to a minimum conduction current through said first electronic switch means and said first charge storage means;

said transfers of electric charge further comprising a second charge transfer from said first charge storage means to a second charge storage means, said second charge transfer being controlled by a second electronic switch means, said inductive means also forming a second resonant circuit with said first and second charge storage means, said second charge transfer responding to said second resonant circuit with a substantially sinusoidal current;

said second electronic switch means being responsive to a second electronic switch control signal, said second electronic switch control signal being responsive to the inverse of said first electronic switch control signal, said second electronic switch control signal also being responsive to the magnitude of a voltage appearing at said second charge storage means, said voltage appearing at said second charge storage means being a result of successive transfers of charge from said first charge storage means to said second charge storage means;

said transfers of charge from said voltage source to said first charge storage means and from said first charge storage means to said second charge storage means being carried by an alternating current, comprising a direct current component of substantially zero magnitude;

said first and said second charge transfers being mutually exclusive;

said second charge storage means being adapted for storing sufficient electric charge for providing an external load with a substantially constant DC voltage and simultaneously maintaining a voltage applied to said external load;

said power conversion method comprising the steps of:

a) transferring charge from said power source to said first charge storage means during a first charge cycle, said charge cycle continuing until said minimum current of said first charge transfer is reached through said first charge storage means;

b) terminating said first charge cycle by opening said first electronic switch means, said first electronic switch means being opened subsequent to deasserting said first electronic switch control signal, said deassertion of said first electronic switch control signal corresponding to said minimum current through said first charge storage means;

c) regulating said DC voltage provided to said external load by selectively omitting said termination of said first charge cycle (step b above), selectively discharging said first charge storage means through said first electronic switch means into said power source, skipping subsequent steps in the given cycle, and commencing a subsequent charge cycle (in step a above);

d) closing said second switch means subsequent to receiving said second switch control signal;

e) transferring charge from said first charge storage means to said second charge storage means through said second electronic switch means during a first discharge cycle, said first discharge cycle being controlled by said second electronic switch means and said second electronic switch control signal, said first discharge cycle commencing subsequent to a delay initiated after terminating said first charge cycle;

f) terminating said first discharge cycle subsequent to detecting a substantial reduction in a charge current supplying charge to said second charge storage means, said termination of said first discharge cycle being performed by opening said second switch means;

g) Initiating a second or subsequent charge cycle by closing said first electronic switch means, wherein said second charge cycle or any subsequent charge cycle is repeated substantially identical to said first charge cycle (in step a above).

* * * * *